(12) United States Patent
Chang et al.

(10) Patent No.: US 8,309,879 B2
(45) Date of Patent: Nov. 13, 2012

(54) PROCESSING APPARATUS USING ULTRASHORT PULSE LASER

(75) Inventors: Won-Seok Chang, Daejeon (KR); Jae-Gu Kim, Daejeon (KR); Sung-Hak Cho, Daejeon (KR)

(73) Assignee: Korea Institute of Machinery & Materials, Daejeon (KR)

( * ) Notice: Subject to any disclaimer, the term of this patent is extended or adjusted under 35 U.S.C. 154(b) by 572 days.

(21) Appl. No.: 12/532,187

(22) PCT Filed: Dec. 27, 2007

(86) PCT No.: PCT/KR2007/006893
§ 371 (c)(1),
(2), (4) Date: Sep. 21, 2009

(87) PCT Pub. No.: WO2008/120853
PCT Pub. Date: Oct. 9, 2008

(65) Prior Publication Data
US 2010/0108649 A1 May 6, 2010

(30) Foreign Application Priority Data

Apr. 2, 2007 (KR) ........................ 10-2007-0032330

(51) Int. Cl.
*B23K 26/00* (2006.01)
*B23K 26/02* (2006.01)

(52) U.S. Cl. .................... 219/121.6; 219/121.78; 372/25
(58) Field of Classification Search ............... 219/121.6, 219/121.67, 121.7, 121.73, 121.78, 121.82; 372/3, 21, 22, 25, 30; 359/385, 388, 368
See application file for complete search history.

(56) References Cited

U.S. PATENT DOCUMENTS

2004/0135079 A1* 7/2004 Moellmann .................... 250/234
2006/0109546 A1* 5/2006 Namba et al. ................. 359/385

FOREIGN PATENT DOCUMENTS

| JP | 2005-144538 | 6/2005 |
| KR | 1020030075246 | 9/2003 |

* cited by examiner

*Primary Examiner* — Hsien Ming Lee
(74) *Attorney, Agent, or Firm* — Lexyoume IP Meister, PLLC.

(57) ABSTRACT

The present invention relates to an ultrashort pulse laser processing device. The ultrashort pulse laser includes a stage a transfer member, a front confocal microscope, a front laser generating unit, and a front highpowered lens. A sample is provided on the stage to be processed, the transfer member transfers the stage, and the front confocal microscope is provided above the stage. The front laser generating unit is provided between the front confocal microscope and the stage to generate an ultrashort pulse laser, and the front high-powered lens focuses the laser provided from the front laser generating unit.

6 Claims, 3 Drawing Sheets

PROCESSING APPARATUS USING ULTRASHORT PULSE LASER

TECHNICAL FIELD

The present invention relates to an ultrashort pulse laser processing device, and more particularly to a processing device for processing a nano-device by using an ultrashort pulse laser.

BACKGROUND ART

Generally, a method using a focused ion beam (FIB) is well known among methods for fabrication of nano-structures.

In a focused ion beam process, a surface of an object material is eliminated by a high energy focused beam. In this case, molecules are eliminated from a surface by ion energy impact generated when focused ions collide with the surface.

However, in the focused ion beam process, there is a problem in that the ions are absorbed through the air, and therefore the focused ion beam process is performed in a vacuum chamber. Accordingly, it is required to additionally provide a vacuum chamber to perform the process in the vacuum chamber, and there is a limit of size and kind of a processing material.

In addition, it is inconveniently required to coat a metal on a surface of a parent material in the focused ion beam process.

DISCLOSURE

Technical Problem

However, in the focused ion beam process, there is a problem in that the ions are absorbed through the air, and therefore the focused ion beam process is performed in a vacuum chamber. Accordingly, it is required to additionally provide a vacuum chamber to perform the process in the vacuum chamber, and there is a limit of size and kind of a processing material.

In addition, it is inconveniently required to coat a metal on a surface of a parent material in the focused ion beam process.

Technical Solution

The present invention has been made in an effort to provide an ultrashort pulse laser processing device for processing a nano-structure in the air by using an ultrashort pulse laser and high resolution measurement modules.

According to an exemplary embodiment of the present invention, an ultrashort pulse laser processing device includes a stage, a transfer member, a front confocal microscope, a front laser generating unit, and a front high-powered lens. A sample is provided on the stage to be processed, the transfer member transfers the stage, and the front confocal microscope is provided above the stage. The front laser generating unit is provided between the front confocal microscope and the stage to generate an ultrashort pulse laser, and the front high-powered lens focuses the laser provided from the front laser generating unit.

A cantilevered nanoprobe microscope may be provided between the high-powered lens and the stage.

A hole may be formed on the stage and the sample is provided on the hole.

A rear confocal microscope may be provided under the stage.

A rear laser generating unit may be provided between the stage and the rear confocal microscope to provide a laser to a rear surface of the stage.

A rear high powered lens may be provided between the rear laser generating unit and the stage.

A charge coupled device (CCD) camera may be provided between the front high-powered lens and the front laser generating unit.

An illuminator may be provided between the CCD camera and the front laser generating unit.

The ultrashort pulse laser may be a femto-second laser or a pico-second laser.

The high-powered lens may be an oil immersion lens.

Advantageous Effects

According to the exemplary embodiments of the present invention, a nano-device may be processed or a nano-structure may be patterned in the air by using an ultrashort pulse laser.

In addition, the ultrashort pulse laser is focused by a high powered lens, a self focusing effect is used, and therefore the nano-device may be precisely processed.

Further, since a confocal microscope and a cantilevered nanoprobe microscope are used to process a sample while observing the sample in detail, the sample may be further precisely processed.

Additionally, since a high powered optical system and a laser generating unit are provided on front and rear surfaces of a stage, the sample may be further precisely processed.

MODE FOR INVENTION

Hereinafter, the present invention will be described more fully with reference to the accompanying drawings, in which exemplary embodiments of the present invention are shown. As those skilled in the art would realize, the described embodiments may be modified in various different ways, all without departing from the spirit or scope of the present invention.

Figure 1:
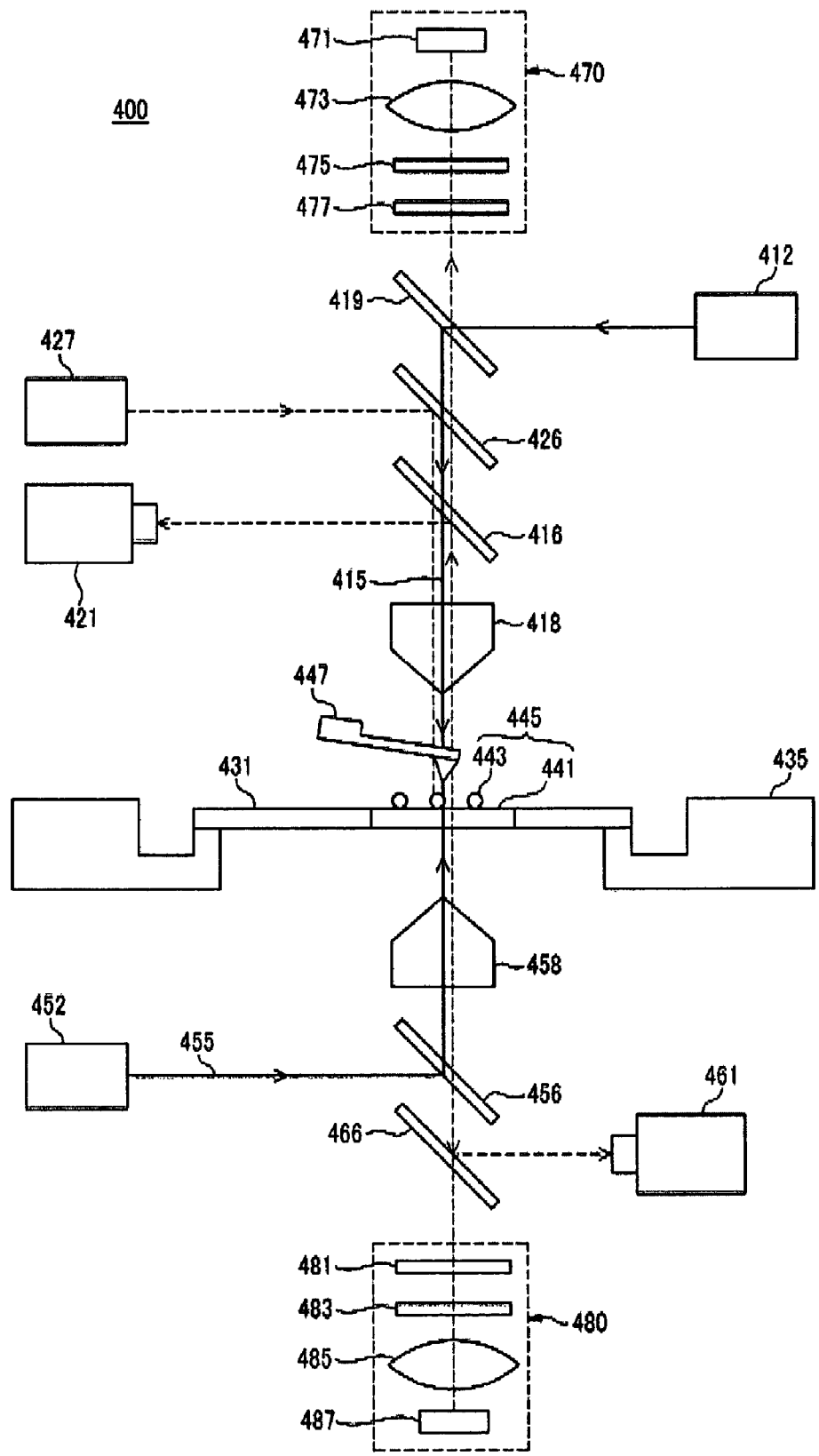
FIG. 1 is a schematic diagram of an ultrashort pulse laser processing device according to a first exemplary embodiment of the present invention.

FIG. 1 is a schematic diagram of an ultrashort pulse laser processing device according to a first exemplary embodiment of the present invention.

Referring to FIG. 1, an ultrashort pulse laser processing device 400 according to the first exemplary embodiment of the present invention includes a stage 431 to which a sample 445 is provided, a front laser generating unit 412 for providing a laser 415 to a front surface of the stage 431, and a high-powered lens 418 for focusing the laser 415 output from the front laser generating unit 412.

The sample 445 is provided on the front surface of the stage 431, and a rear surface of the stage 431 faces in an opposite direction of the front surface.

The front laser generating unit 412 generates the ultrashort pulse laser 415, and the ultrashort pulse laser 415 has a femto-second pulse or a pico-second pulse.

The laser 415 generated by the front laser generating unit 412 is provided to a first front beam dividing unit 419 for changing a path of the laser 415 toward the sample. The first front beam dividing unit 419 includes a beam splitter, and the beam splitter reflects light of a predetermined band and refracts the remaining light. The first front beam dividing unit 419 refracts the laser 415 so that the laser 415 is provided to the sample 445.

An illuminator 427 and a second front beam dividing unit 426 are formed in front of the first front beam dividing unit 419. The illuminator 427 is a light source for lighting the sample 445, and a light generated by the illuminator 427 is refracted by the second front beam dividing unit 426 to be provided to the sample 445.

A charge coupled device (CCD) camera 421 and a third front beam dividing unit 416 are formed in front of the second front beam dividing unit 426. The CCD camera 421 converts light provided from the sample 445 into an image and provides the image to an operator, and the operator may observe a surface of the sample 445. The third front beam dividing unit 416 reflects the light provided from the sample 445 to transmit the light to the CCD camera 421.

Since the high powered lens 418 is provided in front of the third front beam dividing unit 416, the high powered lens 418 is provided to face the front surface of the stage 431. In the first exemplary embodiment of the present invention, the high powered lens has a numerical aperture (NA) that is more than 1, and the high powered lens 418 is formed as an oil immersion lens.

The laser 415 is passed through the high powered lens 418 to be a laser spot of a few hundred nanometer level, a nano-material is heated up by the laser spot, and therefore the nano-material may be eliminated or cut off by a fine line width.

A cantilevered nanoprobe microscope 447 is provided in front of the high powered lens 418, and the cantilevered nanoprobe microscope 447 may determine a shape and a location of a nano-structure since a probe is transformed when the probe gets close to the nano-structure. The cantilevered nanoprobe microscope 447 according to the first exemplary embodiment of the present invention has a resolution of 1 nm, and the location of the nano-material in the air may be accurately measured by using the cantilevered nanoprobe microscope 447 and therefore a carbon nanotube may be precisely processed.

A front confocal microscope 470 is provided on an uppermost part of the ultrashort pulse laser processing device 400, and the front confocal microscope 470 includes two band pass filters 475 and 477, a condenser lens 473 provided on an upper part of the band pass filters 475 and 477, and a photo-detector 471 provided on upper part of the condenser lens 473 to detect light. In the first exemplary embodiment of the present invention, the front confocal microscope 470 has a resolution of 200 nm.

According to the first exemplary embodiment of the present invention, the shape and the location of the sample may be precisely measured since the front confocal microscope 470 and the cantilevered nanoprobe microscope 447 are provided in front of the stage 431, and the location of the sample may be accurately controlled so as to be processed in a desired pattern.

In addition, after the sample is processed, a processing state may be determined by using the front confocal microscope 470 and the cantilevered nanoprobe microscope 447.

Since a self-focusing effect occurs when the ultrashort pulse laser 415 is passed through a non-linear optical media, the laser 415 having passed through the high powered lens 418 by the self-focusing effect is further focused, and therefore a fine process may be performed.

The sample 445 according to the first exemplary embodiment of the present invention includes a substrate 441 and a nano-structure 443 formed on the substrate 441. The substrate 441 may be formed of a silicon wafer or glass, and the nano-structure 443 may be a carbon nanotube or a nanowire that is formed on the substrate 441.

In the first exemplary embodiment of the present invention, it is exemplified that the sample 445 includes the substrate 441 and the nano-structure 443, but it is not limited thereto, and the sample 445 may be the nanotube or the nanowire that is required be adjusted for length.

In addition, the ultrashort pulse laser processing device 400 according to the first exemplary embodiment of the present invention may be used to selectively eliminate metal catalyst particles such as nickel or iron that is attached on an end part of the carbon nanotube in a chemical vapor deposition (CVD) method or a plasma emission chemical vapor deposition method.

Since the sample 445 is provided on the stage 431, the stage 431 is precisely transferred by a transfer member 435. The operator uses the front confocal microscope 470 and the cantilevered nanoprobe microscope 447 to determine the location of the sample 445, and adjusts the transfer member 435 to position the sample 445 on a focusing area.

The ultrashort pulse laser processing device 400 according to the first exemplary embodiment of the present invention is formed to provide a laser to the front surface and the rear surface so as to process the sample.

Accordingly, a round hole is formed at a center area of the stage 431, and the sample 445 is provided to the hole. In addition, the substrate 441 of the sample 445 is formed of a transparent material so that a laser may be transmitted through the substrate 441.

An optical system that is the same as that of the front substrate is provided on the rear substrate of the stage 431, and a rear confocal microscope 480 for observing the sample 445 is provided on the lowest part of the ultrashort pulse laser processing device 400. In a like manner of the front confocal microscope 470, the rear confocal microscope 480 includes two band pass filters 481 and 483, a condenser lens 485, and a photo-detector 487.

A CCD camera 461 for converting light provided from the sample 445 into an image and outputting the light to the sample 445 and a first rear beam dividing unit 466 are provided in front of the rear confocal microscope 480.

A rear laser generating unit 452 for providing a laser 455 to the rear surface of the stage 431 and a second rear beam dividing unit 456 for changing a path of the laser 455 provided from the rear laser generating unit 452 to transmit the laser 455 to the sample 445 are formed in front of the first rear beam dividing unit 466, and a rear high powered lens 458 is provided in front of the second rear beam dividing unit 456. The rear high powered lens 458 is formed as an oil immersion lens in a like manner of the high powered lens 418.

As described, the laser 455 provided to the second rear beam dividing unit 456 is focused by the rear high powered lens 458 to be provided to the sample 445, and therefore the sample may be precisely processed.

In addition, when the laser 455 is provided through the rear surface, the cantilevered nanoprobe microscope 447 provided on the front surface of the stage 431 and the rear confocal microscope 480 provided on the rear surface of the stage 431 are used to determine the shape and the location of the sample 445, and therefore the sample 445 may be easily positioned on a focus area of the laser 455.

Figure 2:
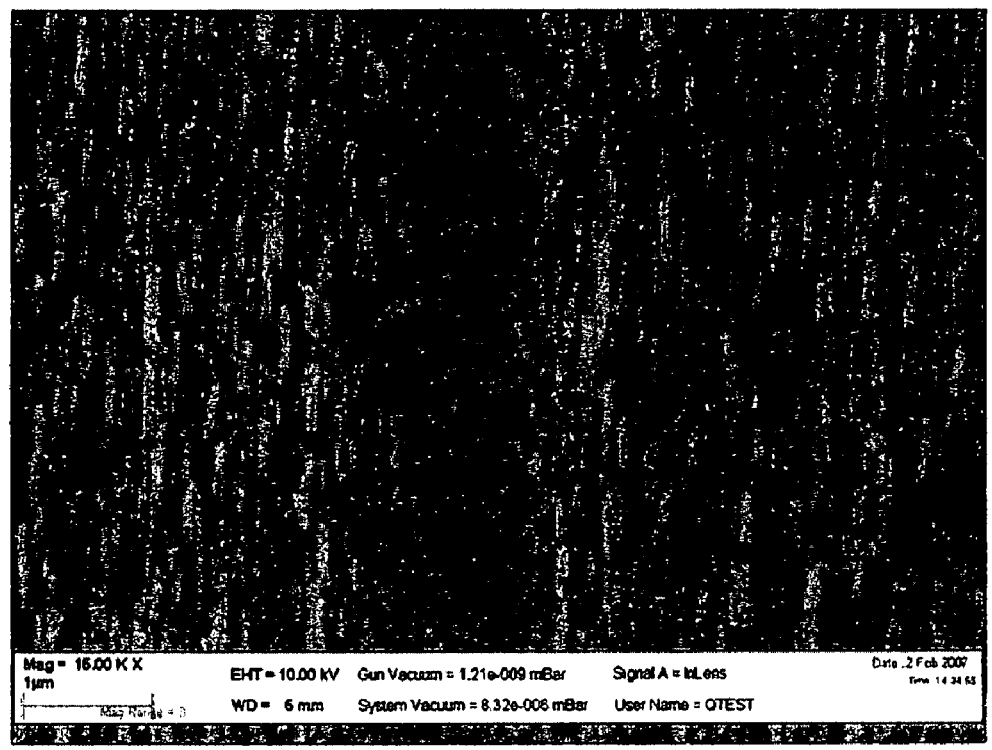
FIG. 2 is a picture representing a patterning result of a carbon nanotube attached on a silicon substrate in the plasma emission chemical vapor deposition method by using the ultrashort pulse laser processing device according to the first exemplary embodiment of the present invention.

FIG. 2 is a picture representing a patterning result of a carbon nanotube attached on a silicon substrate in the plasma emission chemical vapor deposition method by using the ultrashort pulse laser processing device according to the first exemplary embodiment of the present invention.

The above patterning process is performed in the air, and a pattern where a carbon nanotube on a center area of the substrate is cut off is shown in FIG. 2.

Figure 3:
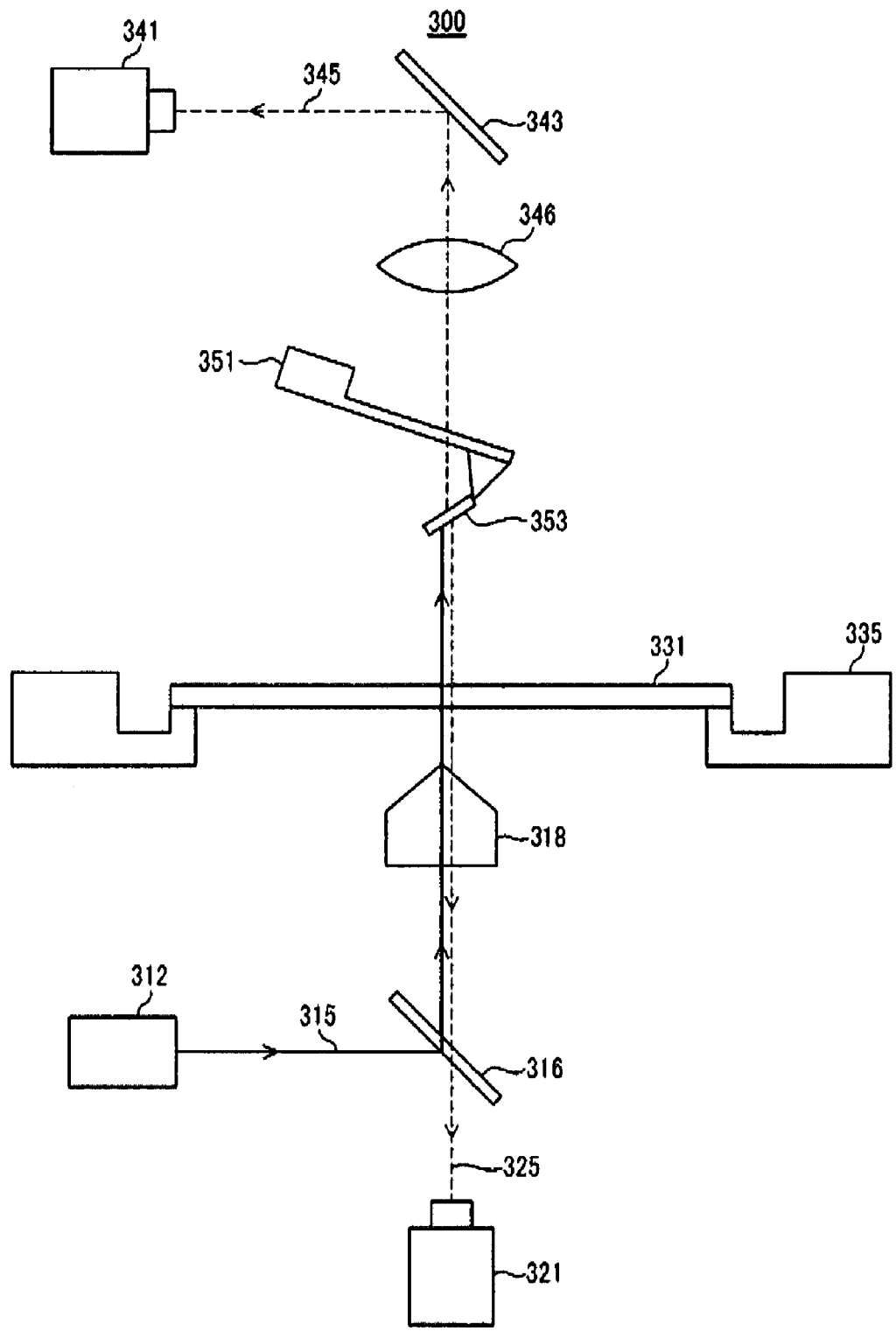
FIG. 3 is a schematic diagram of an ultrashort pulse laser processing device according to a second exemplary embodiment of the present invention.

FIG. 3 is a schematic diagram of an ultrashort pulse laser processing device according to a second exemplary embodiment of the present invention. An ultrashort pulse laser processing device 300 according to the second exemplary embodiment of the present invention processes a nano-device 353 provided to a probe of a cantilevered nanoprobe microscope 351.

Referring to FIG. 3, the ultrashort pulse laser processing device 300 according to the second exemplary embodiment of the present invention includes a stage 331, a transfer member 335 for transferring the stage 331, and the cantilevered nanoprobe microscope 351 provided in front of the transfer member 335.

In addition, the ultrashort pulse laser processing device 300 according to the second exemplary embodiment of the present invention includes a condenser lens 346 for focusing a visible ray 345 provided from the nano-device 353 and a first beam dividing unit 343 for reflecting the visible ray 345 transmitted from the condenser lens 346 to be transmitted to a CCD camera 341. In this configuration, the CCD camera 341 may observe a magnified shape of the nano-device 353.

In addition, a high-powered lens 318 disposed to face the rear surface of the stage 331, a laser generating unit 312 for generating an ultrashort pulse laser 315, and a second beam dividing unit 316 for refracting the laser 315 generated by the laser generating unit 312 to provide the laser 315 to a high-powered lens 318 area are provided at a rear of the stage 331.

Since the second beam dividing unit 316 is formed to refract the laser 315 and transmit the visible ray 325, a CCD camera 321 for using the visible ray 325 transmitted through the second beam dividing unit 316 to examine an object material is provided.

The nano-device 353 is provided to the probe of the cantilevered nanoprobe microscope 351, and a conventional method is used to position the probe of the cantilevered nanoprobe microscope 351 on a focus area of the laser 315. That is, a cantilever detection beam is provided to the probe of the cantilevered nanoprobe microscope 351, the beam reflected from the probe of the cantilevered nanoprobe microscope 351 is observed by a photo-diode, and therefore the probe of the cantilevered nanoprobe microscope 351 is controlled to be positioned on the focus area.

As described, according to the second exemplary embodiment of the present invention, the nano-device 353 provided to the probe of the cantilevered nanoprobe microscope 351 may be easily processed to a desired length by using the ultrashort pulse laser processing device 300.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. An ultrashort pulse laser processing device comprising:
   a stage on which a sample is provided to be processed;
   a transfer member for transferring the stage;
   a front confocal microscope provided above the stage;
   a front laser generating unit provided between the front confocal microscope and the stage to generate an ultrashort pulse laser;
   a front high-powered lens for focusing the laser provided from the front laser generating unit; and
   a cantilevered nanoprobe microscope provided between the high-powered lens and the stage.

2. The ultrashort pulse laser processing device of claim 1, wherein a hole is formed on the stage and the sample is provided on the hole.

3. The ultrashort pulse laser processing device of claim 1, wherein a rear confocal microscope is provided under the stage.

4. The ultrashort pulse laser processing device of claim 3, wherein a rear laser generating unit is provided between the stage and the rear confocal microscope to provide a laser to a rear surface of the stage.

5. The ultrashort pulse laser processing device of claim 1, wherein the ultrashort pulse laser is a femto-second laser or a pico-second laser.

6. The ultrashort pulse laser processing device of claim 1, wherein a nano-device is provided on a probe of the cantilevered nanoprobe microscope to be processed.

* * * * *